Sept. 26, 1967     R. O. ENGH ETAL     3,344,302
RADIATION DETECTOR CHARACTERIZED BY ITS
MINIMUM SPURIOUS COUNT RATE Filed Oct. 9, 1964     2 Sheets-Sheet 1

INVENTORS
ROBERT O. ENGH
ROBERT G. JOHNSON
BY
ATTORNEY

United States Patent Office 3,344,302
Patented Sept. 26, 1967

3,344,302
RADIATION DETECTOR CHARACTERIZED BY ITS MINIMUM SPURIOUS COUNT RATE
Robert O. Engh and Robert G. Johnson, Hopkins, Minn., assignors to Honeywell Inc., a corporation of Delaware
Filed Oct. 9, 1964, Ser. No. 402,785
6 Claims. (Cl. 313—100)

This invention is related to radiation sensitive, gaseous discharge detectors of the Geiger-Müller type. More particularly, it is concerned with ultraviolet sensitive detectors capable of operating at low voltages and having high current carrying capacity while exhibiting minimal spurious count rates What is meant by "Geiger-Müller detector" is a radiation detector having an anode and a cathode disposed in an ionizable gas, and which, upon being subjected to radiation to which it is sensitive, causes an electron to be present within the electric field established by the anode and cathode, whereupon the electron accelerates toward the anode, ionizing the gas, and causing an arc discharge current to flow, which current must be subsequently quenched by means of a quenching mechanism.

Detectors of the prior art have generally been of a high voltage type, in the 700–800 voltage range or higher, requiring special circuitry, special components and special insulation requirements. Furthermore, these detectors have been handicapped by high spurious count rates which gravely affect their reliability. In view of the fact that these detectors are widely used in flame sensing apparatus such as in gas and oil burners, it is important that this handicap be corrected.

Thus, it is an object of this invention to provide a commercially desirable low voltage radiation detector.

It is a further object to provide detectors which are easier to use in conjunction with available voltage sources and which are more convenient in application in that high voltage insulation is not required since certain preferred detectors contemplated herein operate at low voltages.

It is another object to provide a more reliable detector particularly useful in flame sensing apparatus.

It is another and most significant object of this invention to provide a detector exhibiting minimal spurious counts.

With these and other objects in view, a detector in accordance with this invention embodies a radiation permeable envelope, a pair of closely spaced electrodes and a gas filling having ionization coefficient values which promote ionization in the vicinity of the electrodes and inhibit ionization in other regions of the envelope.

A second embodiment of this invention in addition includes an auxiliary electrode or extension arrangement which further aids to eliminate spurious counts.

The spurious count failure mode is the principal unsafe failure mode which exists in Geiger-Müller type detectors. This invention is based upon the realization that the majority of spurious counts in such detectors originate due to electrons emitted from interior surfaces such as envelope walls. To minimize such spurious counts, it is desirable to confine the electric discharge and ionization in the gas mixture to the region between the electrodes which is commonly referred to as the discharge region and to inhibit discharge in other regions within the detector envelope. To accomplish this it is necessary to properly select the type of gas fill, the spacing between the electrodes or the size of the discharge region, and the spacing between the interior surfaces of the detector and the electrodes in accordance with the teachings of this invention. These teachings relate particularly to the relationship between operating voltage, cathode to anode spacing, support wire spacing, fill gas pressure and composition and spacing of the electrodes from the envelope wall.

Figure 1:
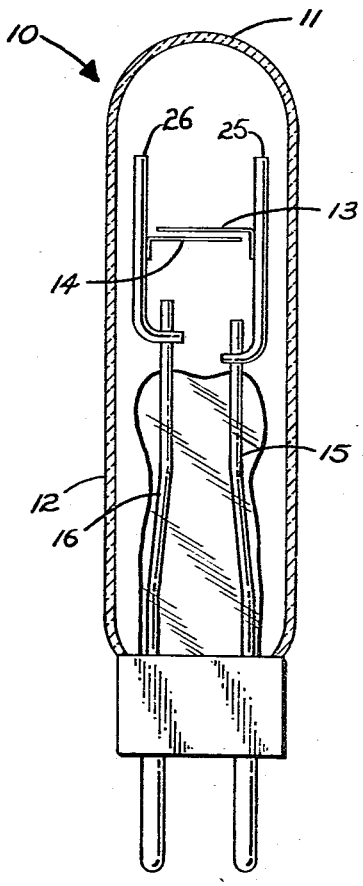
FIGURE 1 is a side view partially in section of a detector prepared in accordance with this invention.

FIGURE 1 illustrates a preferred embodiment of a radiation detector 10 prepared in accordance with this invention. This particular configuration is known as the end view type in which the detector is designed to receive radiation through the end portion 11 of envelope 12 which is made up of an ultraviolet transparent glass such as Corning type No. 9471. Other types of envelopes may be used such as metal envelopes having transparent windows. Positioned within envelope 10 is anode 13 and cathode 14. Anode 13 and cathode 14 are held in relatively closely spaced relationship by support wires 15 and 16 respectively which may be of Kovar or other suitable material, or which may be integral parts of the anode and cathode, respectively. Anode 13 is a screen or mesh electrode. In ultraviolet detectors, molybdenum, nickel or tungsten have been found to be satisfactory anode materials. The mesh form of anode 13 allows radiation entering the detector through end portion 11 to strike cathode 14. Cathode 14 is also preferably formed of molybdenum, nickel or tungsten in the case of ultraviolet detectors because of the desirable work functions of these materials for ultraviolet use. Other materials may be used as is known in the art.

It is to be understood that detectors prepared in accordance with this invention may be other than the end view configuration. The detectors may assume any of a number of forms well known in the art and still utilize the teachings of this invention. The end view configuration is discussed herein since it is the preferred configuration for many commercial applications.

The preferred cathode-anode geometry is the parallel plate configuration as shown by the arrangement of electrodes 13 and 14 in FIGURE 1. Their relationship is more clearly shown in FIGURE 2. This form provides maximum sensitivity at low voltage operation due to the uniform homogenous electrical field created. However, other electrode configurations will function in an improved manner if used in accordance with the teachings found herein.

The closely spaced relationship of the electrodes is important to this invention as discussed hereinbelow since their spacing in conjunction with other considerations is a significant factor in eliminating spurious counts as well as in providing a low voltage detector.

Figure 3:
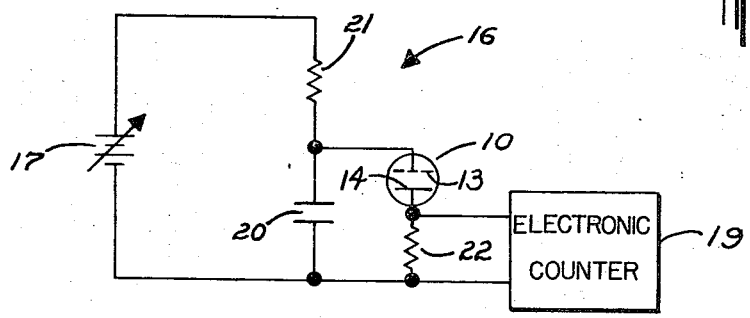
FIGURE 3 is a diagram of an electrical circuit which may be used for quenching the detectors disclosed herein.

The circuit of FIGURE 3 shows a detector 10 together with an associated quenching circuit, collectively designated 16, a source of direct voltage 17 and an electronic counter 19 such as those well known in the art. It is to be noted that there is no provision in this circuit for amplification of the detector output. This is due to the fact that detectors prepared in accordance with the preferred embodiment of this invention draw a current on the order of several milliamperes and hence require no amplification. In this circuit, detector 10 is shown connected across capacitor 20. Between anode 13 and the positive terminal of voltage supply 17 is a large resistor 21. Between cathode 14 and negative terminal of voltage supply 17 is a small resistor 22. This circuit with some modifications is one of many standard quenching circuits which may be used with the detectors. In normal operation, the full voltage of power supply 17 is applied to charge capacitor 20 and is thus applied to detector 10.

Upon receiving radiation of the proper wave length, ionization occurs within detector 10 causing conduction to occur, at which time capacitor 20 discharges through detector 10 and resistor 22. The output of detector 10 is sensed by electronic counter 19 which is connected across resistor 22. As is common in circuits of this type, the conduction of detector 10 is not sustained by the sudden discharge of the energy stored in capacitor 20 due to the slow replacement thereof as controlled by large resistor 21. Thus, detector 10 is quenched.

Figure 4:
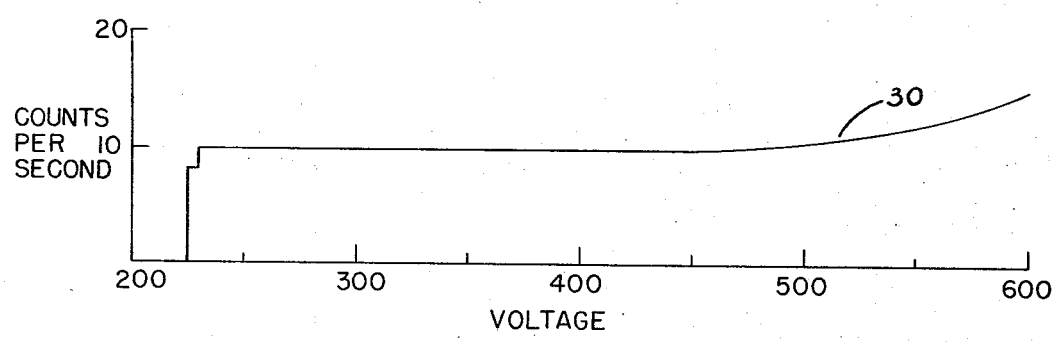
FIGURE 4 is a graph illustrating the operation of a detector prepared in accordance with this invention.

In FIGURE 4, a characteristic curve is shown for a preferred detector built in accordance with the theory set forth herein. This detector was filled with a Penning gas mixture of neon plus 15% hydrogen at a total pressure of 100 torr. Other Penning mixtures such as helium-hydrogen and neon-argon-hydrogen have been found to produce characteristics similar to the neon-hydrogen mixture. The spacing between the anode and cathode of this detector was maintained at .020 inch. The electrodes were of molybdenum. The spacing between electrodes and the envelope wall was carefully kept larger than .080 inch.

The curve of FIGURE 4 illustrates the counting rate of the detector when subjected to an ultraviolet light source flashed at a rate of ten flashes per second. This curve brings out several important points. First, the slope of the curve in the operating plateau region is flat and hence equal to zero. This indicates the absence of measurable spurious counts. Second, the curve shows that the operating voltage of the detector is quite low. Third, the detector may be operated at from about 225 volts to well over 450 volts thus having an operating range of greater than 225 volts.

Figure 5:
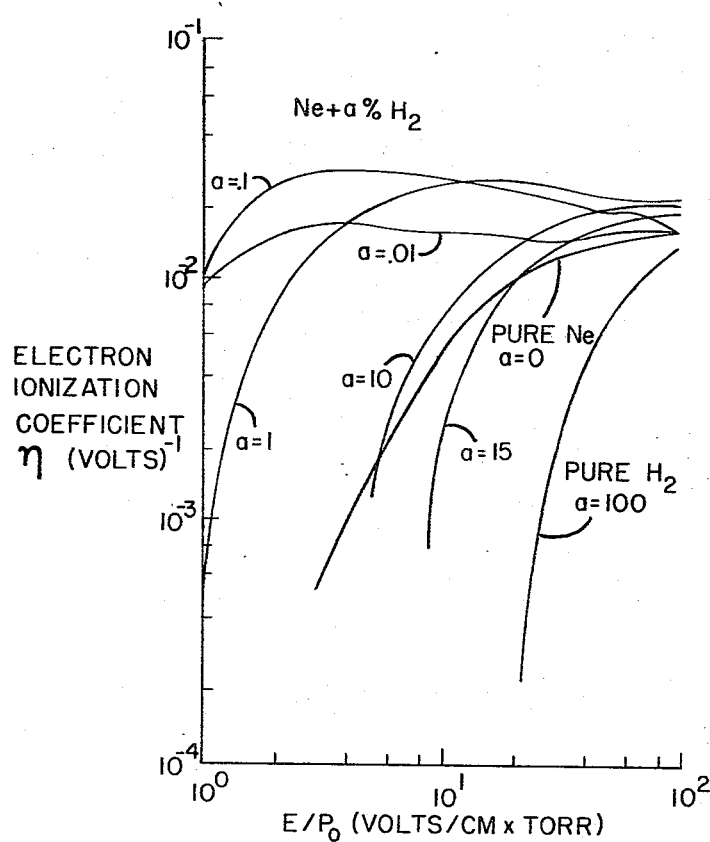
FIGURE 5 is a graph showing $\eta$, the electron ionization coefficient, as a function of E, the electric field and $P_0$, the total gas pressure, for various mixtures of neon and hydrogen.

In FIGURE 5, there are plotted a number of curves showing $\eta$, the electron ionization per volt coefficient, as a function of $E/p_0$, where E is the field strength in volts per centimeter and $p_0$ is the gas pressure in torr. Hereinafter, the electron ionization per volt coefficient will be referred to as ionization efficiency. Curves very similar to these are available in the art for other gases or gas mixtures. A study of the curves in the figure will show that for certain of them the ionization efficiency falls off rapidly at slightly lower $E/p_0$ values. This feature of these curves is important to this invention and its effectiveness in inhibiting spurious counts.

A successful power detector design does two things: It eliminates as far as possible, by cleanliness procedures and processing treatment, the emission of spurious electrons from interior surfaces including the main surface of the cathode. It also suppresses as far as possible the production of electrons and photons by spurious avalanches outside the principal discharge region.

Minimal spurious count rate is the most significant feature of the detectors prepared in accordance with this invention. Background counts can be generated by any effective source of ionizing radiation such as cosmic or penetrating nuclear radiation. In ultraviolet radiation detectors conducting heavy currents as in the preferred embodiments of the present invention, these sources are not normally of significance. The major problem is that of spurious counts which are generated within the detector as a result of various ionization and excitation phenomena connected with previous discharges. The probability of spurious counts occurring increases strongly with increasing applied voltage above a certain value. This limits the operating range of the detector.

If ions and electrons still remain in the gas fill when the tube voltage is restored after a current pulse, as by operating quench circuit 16, a spurious count is almost certain to occur. These residual ions are most likely to be found in weak field or field free regions of the detector envelope. In the detectors of the present invention, it has been found that residual ions and electrons do not form an appreciable source of spurious counts over a broad operating range due to auxiliary electrodes 25 and 26 which will be further described hereinbelow.

Metastable atoms and spurious electrons emitted from surfaces into the gas are a major source of spurious counts. In mixtures consisting only of noble gases, metastable atoms persist in the gas for times comparable to the time of operation of the quench circuit and make power detector operation impossible. Thus, it has become common to add amounts of other gases such as hydrogen to form the well known Penning mixtures. The use of substantial amounts of hydrogen as the minor Penning mixture component in the neon-hydrogen mixture eliminates metastables. The neon metastables are destroyed by ionization of hydrogen molecules and any hydrogen metastables are immediately destroyed by collision with other hydrogen molecules, probably because of near by non-metastable molecular levels. Thus, in a detector using a Penning mixture, as in the preferred embodiments of the present invention, electrons emitted from surfaces inside the detector envelope into the gas are the most prevalent source of spurious counts.

The essence of this invention lies in a detailed study of the ionization efficiency of gas mixtures as a function of $E/p_0$ and the conclusion that the ionization efficiency may be adjusted for various regions in the detector. It is found that the spurious count rate of a detector may be minimized by proper adjustment of the discharge region width ($d$) which exists between the electrodes as it relates to the spacing between the interior surfaces of the detector envelope and the discharge region or electrodes, taking into account the electric field E and the pressure of the gas filling $P_0$. By such adjustments, spurious counts are not only minimized but practically eliminated.

More particularly, a low ionization efficiency is maintained between the discharge region and interior surfaces of the detector. With a low ionization efficiency in these regions, spurious electrons capable of reaching the discharge region have an extremely low probability of causing a spurious count. Since in most detectors, the interior envelope walls are the major sources of spurious electrons, it is important that a low ionization efficiency be maintained between the interior envelope walls and the discharge region. On the other hand, a high ionization efficiency is maintained in the discharge region by properly spacing the electrodes to promote high ionization efficiency in that region.

E, the field strength, is equal to the voltage V divided by the distance $d$ across which the voltage is impressed.

$$E=V/d$$

At any given voltage, V, large distances reduce the field strength while small distances increase it. FIGURE 5 shows that the ionization efficiency is dependent upon E. For a given V, if $d$ is small, the ionization efficiency will be large. If $d$ is large, then the ionization efficency will be small.

The present invention makes use of this information by making the discharge region width $d$ between the electrodes small. This results in a high ionization efficiency in that region of the detector. A low ionization efficiency is achieved in the other regions of the detector by making the distance large between the electrodes or discharge region and the envelope wall.

Figure 2:
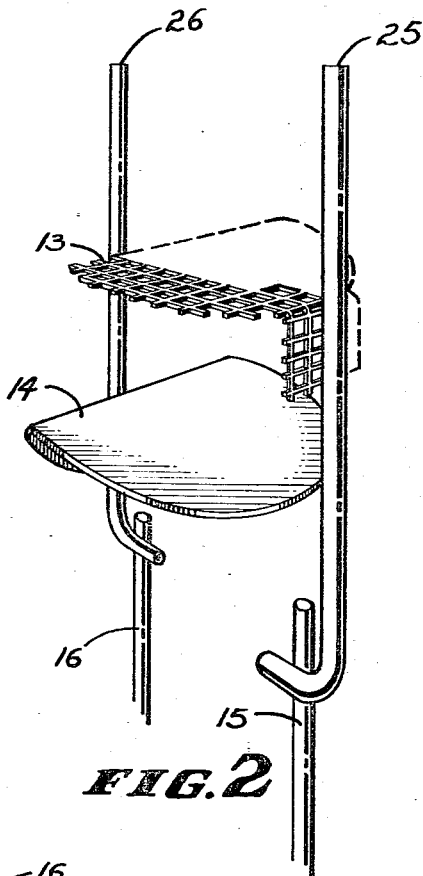
FIGURE 2 is a somewhat enlarged perspective view of a portion of the detector of FIGURE 1 showing the relative construction and position of the electrodes (one of. which is shown partially in phantom outline) for a preferred embodiment.

The particular tube described in FIGURES 1 and 2 was about 2⅝ inches long and about 11/16 inch in diameter. The gas composition was neon plus 15% hydrogen at a pressure of 100 torr. The relatively high pressure reduced undesirable sputtering, an important factor for achieving long life. The composition chosen permits the desired low voltage operation at the 100 torr pressure. This composition and the 100 torr pressure permit the operation of the cathode-anode region of the tube (discharge region) at a high level of ionization efficiency, about 1.5 times $10^{-2}$ or above, as in FIGURE 5.

Under these conditions the ionization efficiency curve falls off quite rapidly for slightly lower $E/p_0$ values characteristic of spaces outside the discharge region thus providing good protection against spurious count discharges. Contrast the 10% curve with the 1% curve in this respect. If the percentage of hydrogen were much above 15%, the operating voltage would have to be increased since the ionization efficiency decreases. If the percentage of hydrogen were very much reduced, the ionization efficiency would remain high for the low $E/p_0$ regions and the probability of spurious count generation would greatly increase.

Further study of FIGURE 5 will show that composition and pressure can be used somewhat inter-relatedly and arbitrarily over a limited range to achieve identical ionization efficiency values in the discharge region for the same operating voltage. Hence, the particular pressure and composition selected may be somewhat arbitrary.

In this context, a spacing between the electrodes of .020 inch was selected. With the relatively high gas pressure, and with the requirement for a low operating voltage, it is necessary to select a small cathode to anode separation (d). This can be understood from FIGURE 5. The higher the ionization efficiency is in the cathode-anode gap or discharge region, the lower the breakdown voltage is in that region. For the 100 torr gas pressure and 15% hydrogen composition, a spacing of .020 inch is necessary to place the breakdown voltage adequately below the operating voltage and to insure an adequate operating range. A very much larger spacing would require a corresponding reduction in fill gas pressure or hydrogen percentage, either change increasing the spurious count probability and introducing other major changes such as increased sputtering and a substantial decrease in cathode current density.

The spacing of the electrodes from the side walls is not critical for this particular size tube if kept larger than about .080 inch. This spacing takes advantage of the low ionization efficiency part of the curve for this particular composition and pressure as shown in FIGURE 5 and is great enough so that sputtering from the envelope wall to the electrodes cannot occur. It is to be understood that the spacings will vary for other detector sizes, gas fills, gas pressures and the like. Particular spacings must be selected for various detectors in accordance with the teachings of this invention.

As previously mentioned, this invention also provides an auxiliary electrode or extension arrangement which may be utilized in combination with the above teachings to further insure that spurious counts will be maintained at a minimal level.

In FIGURES 1 and 2 there is shown a pair of electrode extensions 25 and 26 contacting anode 13 and cathode 14 respectively. These extensions occupy the upper region of envelope 12. In this region of the detector, the electric field is relatively weak. Due to the weak field, it has been found that ions emitted from the envelope wall are sometimes present which are not removed with adequate speed. Ions which are allowed to remain in that region are a possible source of spurious counts since they may fall into the discharge region at a later time and cause the detector to count undesirably. The electrode extensions 25 and 26 extend the voltage range of operation and increase the margin of safety against tube failure by providing a strong clearing field in this region of the detector. Cathode extension 26 actually provides the clearing field while anode extension 25 acts as a collecting point.

Extensions 25 and 26 may be separate wires or the like connected to the electrodes by soldering or welding. On the other hand, extensions 25 and 26 may merely be continuations of the electrode supports 15 and 16.

It is preferred that the cathode extension 26 be of a material having about the same work function as the cathode or a higher work function. When it is of a material having a lower work function than the cathode, the glow resulting from tube operation tends to concentrate on the extension rather than completely covering the cathode. This causes a deterioration in the sensitivity of the tube. The anode extension 15 may be of any conductive material.

The invention should not be limited to the embodiments described herein. Persons skilled in the art will readily utilize these teachings for the construction of a large variety of radiation detectors.

What is claimed is:

1. A radiation detector tube characterized by its minimum spurious count rate, comprising:
   a gas tight envelope defining an enclosed volume, said envelope including a radiation permeable end portion;
   a planar cathode and a screen-like planar anode in said enclosed volume, said cathode being capable of releasing photoelectrons in response to impinging radiation to be detected;
   cathode and anode support means positioning said anode and cathode in predetermined closely spaced relationship with respect to each other and in predetermined relatively large spaced relationship with respect to the interior surfaces of said envelope, said cathode support means also positioning said cathode substantially transverse with respect to said radiation permeable end portion of said envelope, said anode support means also positioning said anode substantially parallel to said cathode and between said cathode and said radiation permeable end portion of said envelope;
   an elongated conductive member on said cathode support means extending beyond said anode toward said radiation permeable end portion of said envelope, and
   a gas filling in said enclosed volume adapted to be ionized upon the production of photoelectrons at said cathode and produce a discharge in the space between said cathode and said anode, said gas filling being further characterized in that it has an electron ionization coefficient which varies substantially as a function of $E/P_0$, and has a predetermined relatively high ionization coefficient corresponding substantially to the $E/P_0$ characteristics of the predetermined spacing between said electrodes and a predetermined relatively low ionization coefficient corresponding substantially to the $E/P_0$ characteristics of the predetermined spacing between said electrodes and the interior surfaces of said envelope whereby the ionization of said gas filling is promoted in the space between said electrodes and minimized in the space between said electrodes and the interior surfaces of said envelope.

2. The radiation detector tube of claim 1 wherein:
   said gas consists essentially of about 15% hydrogen, balance neon, at a total pressure of about 100 torr;
   said electrodes are spaced about .020 inch apart and at least about .080 inch from the interior surface of said envelope, and
   said elongated conductive member is carried by said cathode.

3. A radiation detector tube characterized by its minimum spurious count rate and adapted to operate within a certain predetermined voltage range, comprising:
   a gas tight envelope defining an enclosed volume, said envelope including a radiation permeable portion for allowing the entrance into said enclosed volume of radiation to be detected;
   an anode and a cathode electrode in said enclosed volume, said cathode electrode being capable of releasing photoelectrons in response to impinging radiation to be detected;
   support means positioning said electrodes in a predetermined closely spaced relationship with respect to each other providing a region therebetween adapted to have a first predetermined field strength ($E_1$) in accordance with the predetermined voltage range and the close spacing, said support means also positioning said electrodes in predetermined relatively large spaced relationship with respect to the interior surfaces of said envelope providing a region therebetween adapted to have a second predetermined field strength ($E_2$) in accordance with the predetermined voltage range and the large spacing, and a gas filling at a predetermined pressure ($P_0$) in said enclosed volume adapted to be ionized upon the production of photoelectrons at said cathode electrode and produce a discharge in the space between said electrodes, said gas filling being further characterized in that it has an electron ionization coefficient which varies substantially as a function of $E/P_0$, and has a first predetermined relatively high ionization coefficient corresponding substantially to the $E_1/P_0$ characteristics of the predetermined close spacing between said electrodes and a second predetermined relatively low ionization coefficient corresponding substantially to the $E_2/P_0$ characteristics of the predetermined large spacing between said electrodes and the interior surfaces of said envelope, whereby the ionization of said gas filling is promoted between said electrodes and substantially minimized between said electrodes and the interior surfaces of said envelope.

4. The radiation detector tube of claim 3 wherein said gas is further characterized in that it is a Penning mixture whereby said tube will operate at a low voltage.

5. The radiation detector tube of claim 4 wherein:
said mixture consists essentially of about 15% hydrogen, balance neon, at a total pressure of about 100 torr, and
said electrodes are spaced about .020 inch apart and at least about .080 inch from the interior surfaces of said envelope.

6. The radiation detector tube of claim 3 wherein:
said cathode is a planar electrode;
said support means positions said cathode substantially transverse with respect to said radiation permeable portion of said envelope;
said anode is a screen-like planar electrode, and
said support means positions said anode substantially parallel to said cathode and between said cathode and said radiation permeable portion of said envelope.

References Cited

UNITED STATES PATENTS

| | | | |
|---|---|---|---|
| 1,948,720 | 2/1934 | Knowles | 313—200 |
| 2,564,040 | 8/1951 | Vance | 313—217 X |
| 2,944,152 | 7/1960 | Johnson et al. | 340—228 X |
| 3,047,761 | 7/1962 | Howling | 313—93 |
| 3,213,312 | 10/1965 | Crowe et al. | 313—185 X |
| 3,255,354 | 6/1966 | Cade | 313—101 |

JAMES W. LAWRENCE, *Primary Examiner.*

R. JUDD, *Assistant Examiner.*